A. R. WOLKEN.
FRUIT PICKER.
APPLICATION FILED MAR. 11, 1916.

1,265,410.

Patented May 7, 1918.

WITNESSES
R. D. Spaulding
M. Jones

INVENTOR
Arthur R. Wolken
BY Richard B. Owen,
ATTORNEY

UNITED STATES PATENT OFFICE.

ARTHUR R. WOLKEN, OF GILMAN, IOWA.

FRUIT-PICKER.

1,265,410.  Specification of Letters Patent.  Patented May 7, 1918.

Application filed March 11, 1916. Serial No. 83,593.

*To all whom it may concern:*

Be it known that I, ARTHUR R. WOLKEN, a citizen of the United States, residing at Gilman, in the county of Marshall and State of Iowa, have invented certain new and useful Improvements in Fruit-Pickers, of which the following is a specification.

My invention relates to a fruit picker.

The main object of the invention is to provide a generally improved, efficient and simplified article of this nature and one particularly having means to dislodge the fruit merely through movement of the article as a whole, and further one wherein the picking means serves to form a guard for the handle to minimize the chances of accidental detachment.

With the above and additional objects such as will hereinafter appear, the invention has been embodied in one preferred form as illustrated in accompanying drawings and hereinafter described.

Figure 1:
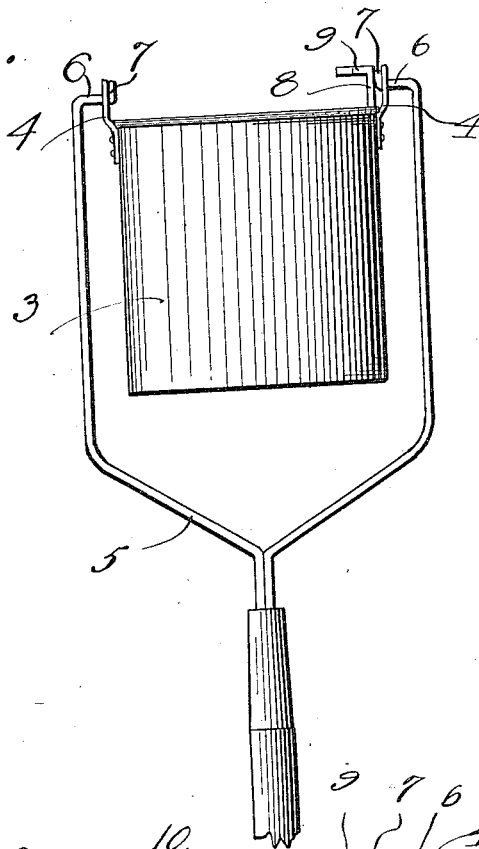
Figure 2:
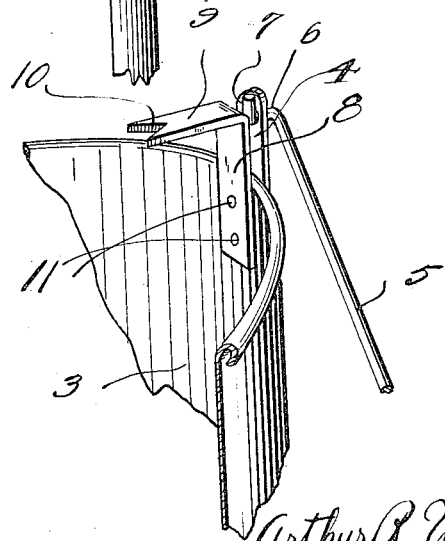

In said drawings:

Figure 1 is a view of the improved fruit picker in side elevation but with the handle shown fragmentarily, and Fig. 2 is a fragmentary perspective view of the receptacle.

Referring specifically to the drawings, 3 designates a receptacle for picked fruit which has lugs 4 secured thereto at diametrically opposite points and in which a handle 5 of any approved type is pivotally mounted by means of bearing portions 6 thereof and which terminate in fastening lugs 7 extending at an angle thereto and disposed intermediate the lugs 4. As a result, the receptacle 3 is pivotally mounted from the handle so as to normally seek the vertical.

A picker is provided consisting of a tang 8 and a hook 9 integral therewith and extending at an angle thereto and being provided with a picking notch 10. The fastening means for one of the lugs 4 may be rivets 11. Such rivets 11, preferably extend through the wall of the receptacle 3 and the tang 8 thus serving to fasten both the picker and one lug 4. In addition, the tang 8 is disposed relatively close to the adjacent lug 7 so as to minimize the chances of the lug 7 straightening and accidentally disengaging the adjacent lug 4. This feature is especially desirable, since the article in operation is usually disposed above the head of the operator and the chances of the receptacle becoming detached and falling upon the operator should be avoided. In addition, falling of the receptacle 3 would be detrimental to fruit contained therein.

In the operation of picking, the article is held by the handle and is moved relatively to the fruit so that the stem thereof is received in the notch 10 of the hook 9 whereupon the article is moved downwardly so that the arms of the hook 9 will bear against the fruit and cause its severance from the supporting limb. I do not, of course, limit the use of the article to any particular fruits nor to manufacture from any particular material.

It will be readily realized that I have provided an article which can be expeditiously used for the rapid picking of fruit.

Since merely the preferred embodiment has been illustrated and described, it is to be understood that changes in the details of construction may be resorted to within the spirit and scope of the invention as defined by the appended claim.

I claim:

A fruit picker, including a receptacle, a pair of oppositely arranged apertured ears secured to the outer face of the receptacle and extending above the upper edge thereof, a shank secured to the inner face of said receptacle and extending above the upper edge thereof, in spaced parallelism with one of said ears, the upper end of said shank being forked and directed inwardly at right angles to provide a fruit detaching member; a handle forked at one end to provide parallel supporting arms, the free ends of said arms being bent and directed inwardly through the apertures in said ears, and then extended at right angles to lie flat against the inner face of the ears, one of said angularly extended portions engaging the shank of the detaching member at all times to reinforce the latter while in use.

In testimony whereof I affix my signature in presence of two witnesses.

ARTHUR R. WOLKEN.

Witnesses:
 DANNIE WOLKEN,
 ROLLAND CRONK.

Copies of this patent may be obtained for five cents each, by addressing the "Commissioner of Patents, Washington, D. C."